Jan. 9, 1962

O. COOK, JR., ET AL 3,016,192

LIQUID REGISTERING DEVICE

Filed May 22, 1958

CO-INVENTORS:
Odie Cook, Jr. and
BY James H. Coulliette,

Harrington A. Lackey
ATTORNEY.

Jan. 9, 1962     O. COOK, JR., ET AL     3,016,192
LIQUID REGISTERING DEVICE

Filed May 22, 1958     2 Sheets-Sheet 2

CO-INVENTORS;
Ocie Cook, Jr. and
BY James H. Coulliette,

Harrington A. Lackey
ATTORNEY.

United States Patent Office 3,016,192
Patented Jan. 9, 1962

3,016,192
LIQUID REGISTERING DEVICE
Ocie Cook, Jr., Chattanooga, Tenn. (830 N. 33rd St., Birmingham, Ala.), and James H. Coulliette, % Industrial Research Institute, 614 Baldwin Ave., Chattanooga, Tenn.
Filed May 22, 1958, Ser. No. 737,105
1 Claim. (Cl. 235—94)

This invention relates to a liquid registering device and more particularly to a device for measuring the amount of gasoline introduced into a tank.

It is an object of this invention to provide an improved registering device which may be installed in the gasoline tank of a highway vehicle, such as a truck or tractor, in order that the amount of gasoline pumped into the tank may be accurately recorded.

Another object of this invention is to provide a liquid regisering device which will record only those amounts of gasoline which are introduced into the tank regardless of the level of the liquid and will not record or subtract any amounts of gasoline which are withdrawn from the tank.

Another object of this invention is to provide a liquid registering device incorporating a float adapted to rise and fall with the change in the level of the liquid in a tank, the rise of the float being adapted to actuate a totalizing counter or recorder, the counter being rendered inoperative when the float is stationary or falling.

A further object of this invention is to provide a liquid registering device incorporating a float which is adapted to rise and fall with the change in the level of the liquid in a tank and having means to lock the float to a rotatable spiral blade when said float is rising to rotate the blade thereby actuating a counter or recorder, and means to unlock the float and spiral blade when the float is stationary or falling.

Further objects and advantages of the invention will be apparent from the following description taken in conjunction with the drawings, wherein.

Figure 1:
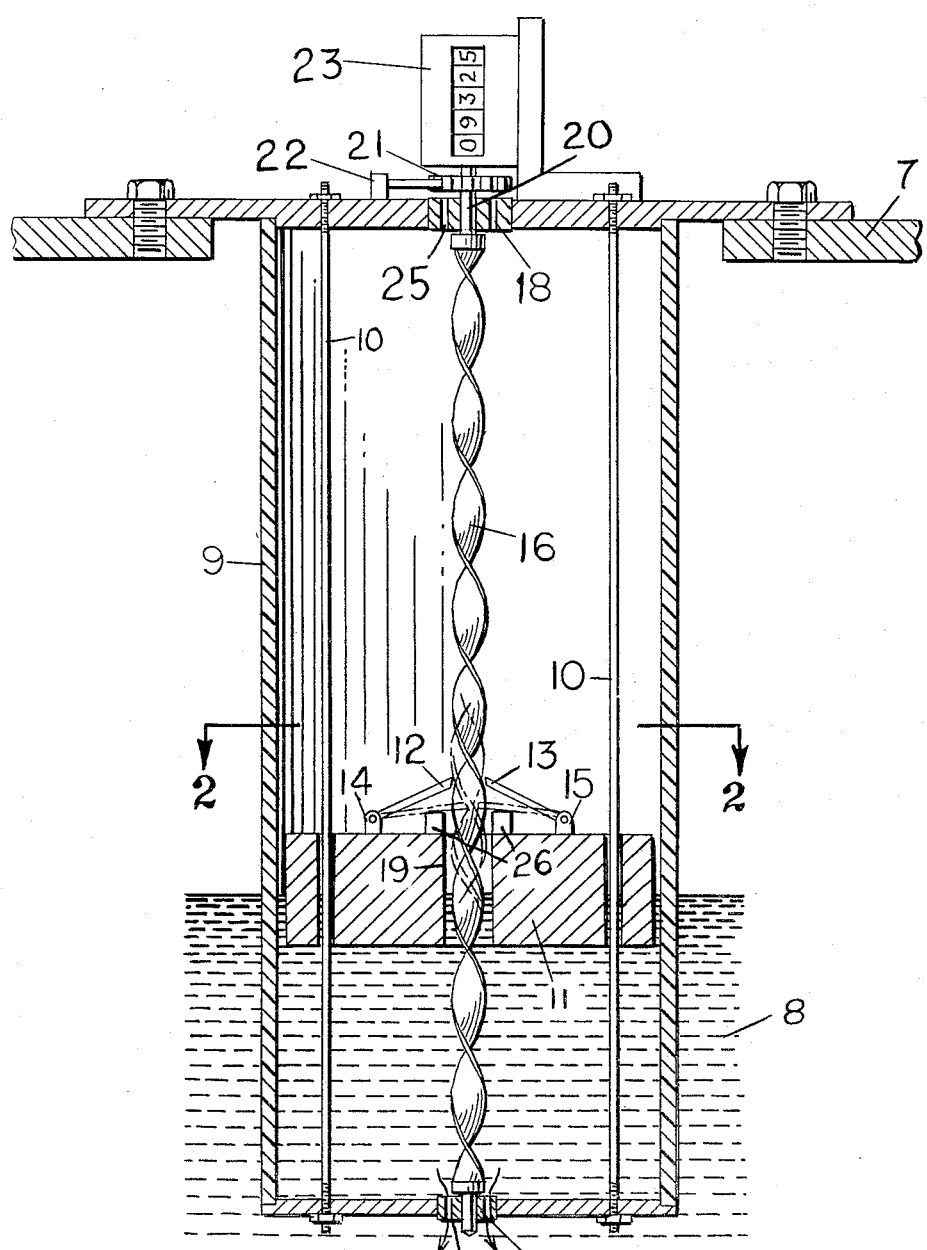
FIG. 1 is a side elevational view, partly in section, disclosing one modification of the invention.

Referring now to the drawings in more detail, a tank 7 containing a liquid 8, such as gasoline, has immersed therein a cylindrical housing or container 9. Vertically mounted in the cylindrical housing 9 are a pair of guide rods 10 diametrically spaced from each other and the ends of which are fixed in the top and the bottom of the cylindrical housing 9. Mounted for vertical, but non-rotative movement on the guide rods 10 is the float 11, which is adapted to rise and fall with the change in the level of the liquid 8.

Mounted on top of the float 11 (FIGS. 1 and 2) are a pair of substantially flat rectangular vanes 12 and 13 freely pivoted upon hinges 14 and 15, respectively, and diametrically opposed to each other on opposite sides of the spiral blade 16. The blade 16 is vertically and rotatably mounted in bearings 17 and 18 in the bottom and the top of the cylindrical housing 9, respectively, and is adapted to pass through the cylindrical opening 19 in the center of the float 11. The diameter of the opening 19 is large enough to permit the float 11 to move vertically on the guide rods 10 without engaging the spiral blade 16, even when the blade 16 is rotating. In other words, the diameter of the cylinder of revolution generated by the rotation of the edges of the spiral blade 16 is less than the diameter of the opening 19. However, the free ends of the vanes 12 and 13 will extend beyond the sides of the opening 19 when they are pivoted downward by their own weight to a substantially horizontal or coplanar position against the stops 26, as disclosed by the dashed lines in FIG. 1, to engage a cross-section of the spiral blade 16 which is substantially parallel to the end edges of the vanes 12 and 13. In this dashed line position, the vanes 12 and 13 will force the spiral blade 16 to slideably turn between the vanes 12 and 13 when the float 11 rises, because the thrust of the blade is downward upon the vanes and the pivotal movement of the blades is limited by the stops 26. Thus, when liquid 8 is introduced into the tank 7, the rising float 11 will turn the spiral blade 16 to rotate the shaft 20 to actuate the counter or recorder 23. The counter 23 may be of any conventional type and is calibrated with the number of turns in the spiral blade 16 to accurately register the number of units, such as gallons, of the liquid 8 introduced into the tank 7.

An equally effective mechanism may be obtained by eliminating the stops 26 and locating the hinges 14 and 15 closer to the top of the float 11 so that the vanes 12 and 13 will lie substantially flat on top of the float in their lowermost pivotal positions.

Figure 2:
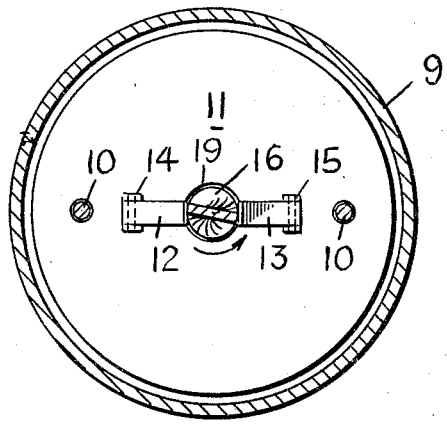
FIG. 2 is a section taken along the lines 2—2 of FIG. 1.

When the level of the liquid 8 remains stationary, the float 11 remains stationary, and the position of the vanes 12 and 13 will be either that of the solid or dashed lines position disclosed in FIG. 1, depending on the position of the spiral blade 16 at that particular point.

When the level of the liquid 8 falls, the float 11 will descend and the free ends of the pivoted vanes 12 and 13 will pivot upward to ride downward along the outer edges of the spiral blade 16 without causing the spiral blade 16 to rotate. As an additional precaution to prevent reverse rotation of the spiral blade 16, the ratchet 21 is fixed on the shaft 20, and the pawl 22 is adapted to engage the teeth of the ratchet 21, except when the spiral blade 16 is rotated in the direction of the arrow disclosed in FIG. 2 by the rising float 11. Therefore, when liquid is being discharged from the tank 7, no change will be recorded on the counter 23.

Openings 24 are provided in bearing 17 in order to permit the free passage of liquid 8 between the tank 7 and the interior of the housing 9. Apertures 25 are also provided in bearing 18 in order to permit the free passage of air between the interior of the cylindrical housing 9 and the atmosphere.

Figure 4:
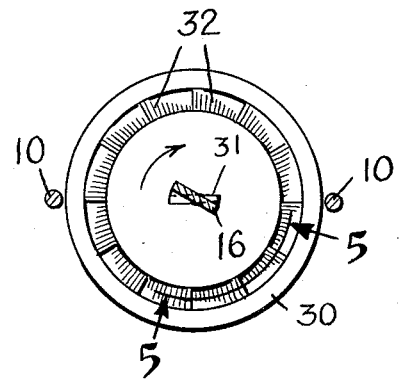
FIG. 4 is a section taken along the lines 4—4 of FIG. 3.
Figure 5:
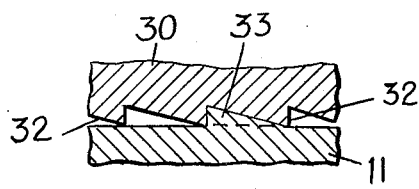
FIG. 5 is a section taken along the lines 5—5 of FIG. 4.
Figure 3:
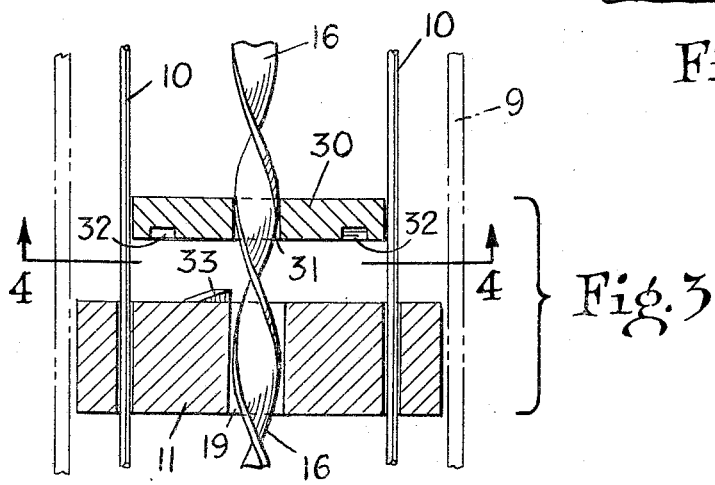
FIG. 3 is an enlarged sectional view, similar to FIG. 1, disclosing another modification of the invention.

FIGS. 3, 4 and 5 disclose a modified means for locking the float 11 to the spiral blade 16 when the float 11 is rising and for unlocking the float and spiral blade when the float is falling. To this end, a disc 30 is provided having a slot 31 therethrough of a substantially rectangular shape adapted to slideably engage the cross-section of the spiral blade 16 passing through the slot 31. Such a construction permits the disc 30 to freely and slideably descend by virtue of its own weight and at the same time spin or rotate about the spiral blade 16, until the disc rests on top of the float 11, where means are provided to prevent rotation between the float 11 and the disc 30. Such means may comprise circumferentially disposed ratchet teeth 32 formed in the base of the disc 30 and a detent or pawl 33 protruding above the top of the float 11, and adapted to register with any one of the teeth 32 when the disc 30 engages the top of the float 11. The greater the number of teeth 32, the less opportunity there is for lost motion between the disc 30 and the float 11.

When the liquid level is stationary, the disc 30 will rest upon the top of the float 11 and the detent 33 will engage one of the teeth 32. When the liquid level rises and urges the float 11 upward along the vertical guide rods 10, the disc 30, being fixed to the top of the float 11 by the ratchet teeth 32 and the detent 33 so that the disc will not rotate, will cause the slot 31 to slide upward along the spiral blade 16. Because the slot 31 has the same contour as the cross-section of the spiral blade 16, the slot will force the blade to rotate in the direction of the arrow disclosed in FIG. 4. The spiral blade 16 disclosed in FIG. 3 is connected to a shaft 20 and counter 23 in the same manner as disclosed in FIG. 1 in order to record the increase in the volume of liquid in tank 7.

When the liquid level falls, the float 11 will descend, and the disc 30 will slideably spin downward along the blade 16, without rotating the blade. Whether or not the disc 30 will become completely disengaged from the falling float 11, or whether or not the ratchet teeth 32 will merely slide across the detent 33, depends on the rate of descent of the disc 30 determined by the snugness of the fit between the sides of the slot 31 and the spiral blade 16 and the rate of fall of the liquid level.

It will be evident that the circumferentially disposed ratchet teeth 32 and the detent 33 might be reversed so that the teeth 32 are formed in the top of the float 11 and the detent 33 protrudes from the bottom of the disc 30. It will also be apparent that other types of engaging means might be used between the disc 30 and the float 11, so long as the disc 30 is locked to the float 11 to rotate the spiral blade 16 when the float 11 rises.

This type of liquid registering device, in any of its modified forms, is economical and easy to construct. Use of such a device would be invaluable to trucking companies, as a means of automatically and accurately recording the amounts of fuel added to the gasoline tanks on the trips of its various vehicles. Such a device would eliminate the necessity of requiring the driver of the vehicle to keep records and collect receipts for his various fuel purchases and eliminate wasting his time in such activities.

It will be apparent to those skilled in the art that various changes may be made in the invention, without departing from the spirit and scope thereof, and therefore the invention is not limited by that which is shown in the drawings and described in the specification, but only as indicated in the appended claim.

What is claimed is:

A registering device for a liquid tank comprising a float adapted to rise and fall with the change in the level of the liquid in the tank, means for vertically guiding and for preventing the rotation of said float, a spiral blade mounted in said tank for rotation about its vertical longitudinal axis, a vertical opening in said float through which said spiral blade is adapted to freely rotate without engaging said opening, a pair of substantially flat vanes pivotally mounted on said float on opposite sides of said spiral blade, said vanes being adapted to snugly engage said spiral blade when said vanes are substantially coplanar with each other, said vanes being adapted to rotate said spiral blade when said float is rising, and being adapted to freely ride on said blade without rotating said blade when said float is falling, and a totalizing counter adapted to be actuated by the rotation of said blade.

References Cited in the file of this patent

UNITED STATES PATENTS

| | | |
|---|---|---|
| 361,227 | Morgan | Apr. 12, 1887 |
| 389,613 | Thiem | Sept. 18, 1888 |
| 432,476 | Carr | July 15, 1890 |
| 992,370 | Mastrup | May 16, 1911 |
| 1,300,327 | Benjamin | Apr. 15, 1919 |
| 1,345,154 | Fahl | June 29, 1920 |
| 1,387,022 | Stuber | Aug. 9, 1921 |
| 1,453,716 | MacGill | May 1, 1923 |
| 1,570,481 | Grain | Jan. 19, 1926 |
| 1,970,722 | Withers et al. | Aug. 21, 1934 |
| 2,794,265 | Kruger | June 4, 1957 |